(12) United States Patent
Stephens (10) Patent No.: US 7,349,821 B2
(45) Date of Patent: *Mar. 25, 2008

(54) BI-DIRECTIONAL SIGNAL CONVERTER

(75) Inventor: Alexander R. Stephens, San Luis Obispo, CA (US)

(73) Assignee: Miranova Systems, Inc., San Luis Obispo, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 10/934,296

(22) Filed: Sep. 3, 2004

(65) Prior Publication Data

US 2005/0111609 A1    May 26, 2005

Related U.S. Application Data

(63) Continuation of application No. 10/143,500, filed on May 7, 2002, now Pat. No. 6,789,041.

(60) Provisional application No. 60/289,702, filed on May 8, 2001.

(51) Int. Cl.
*G06F 15/00* (2006.01)

(52) U.S. Cl. ........................ 702/150; 702/127

(58) Field of Classification Search ................ 356/616, 356/617; 702/150, 161, 163, 164, 127, 151, 702/97, 158, 159; 341/1, 2, 6, 4, 138; 73/1.79, 73/1.81; 116/230, 231; 324/207.11, 207.23
See application file for complete search history.

(56) References Cited

U.S. PATENT DOCUMENTS

| | | | |
|---|---|---|---|
| 2,954,165 A | | 9/1960 | Myers |
| 3,564,218 A | | 2/1971 | Lay |
| 3,670,324 A | * | 6/1972 | Trevor, III ..................... 341/6 |
| 3,916,174 A | * | 10/1975 | Moule ........................ 702/163 |
| 3,976,946 A | | 8/1976 | Schroder |
| 4,482,972 A | | 11/1984 | Lewis et al. |
| 4,486,845 A | | 12/1984 | Duckworth |
| 4,555,793 A | | 11/1985 | Benamy |
| 4,658,406 A | | 4/1987 | Pappas |
| 4,831,510 A | | 5/1989 | Dummermuth et al. |
| 4,884,226 A | | 11/1989 | Sakano |
| 4,975,931 A | | 12/1990 | Cosand |
| 5,059,924 A | | 10/1991 | JenningsCheck |
| 5,127,035 A | * | 6/1992 | Ishii ............................ 377/24 |
| 5,237,521 A | * | 8/1993 | Raj et al. .................... 702/163 |
| 5,287,296 A | | 2/1994 | Bays et al. |

(Continued)

*Primary Examiner*—John Barlow
*Assistant Examiner*—Douglas N Washburn
(74) *Attorney, Agent, or Firm*—Thomas F. Lebens; Sinsheimer Juhnke Lebens & McIvor, LLP (57) ABSTRACT

A device and method for conversion of bi-directional signals using controlled dual value up/down counters uses a plurality of cascaded up/down counters chained together to alter the ratio of a maximum coefficient of N to N+1 for the first counter in the cascade of counters. The output count signal of each counter is connected to the clock signal input of the next counter. The signal to be converted is input to the first counter in the chain and each input pulse increments or decrements a count value for the counter until a maximum coefficient or zero is reached at which point a count pulse is output of the counter and it is then reset to zero or the maximum coefficient at the next input pulse depending on whether a direction input is high or low circuit.

19 Claims, 11 Drawing Sheets

U.S. PATENT DOCUMENTS

| | | |
|---|---|---|
| 5,335,253 A | 8/1994 | Oliver et al. |
| 5,426,457 A | 6/1995 | Raskin |
| 5,561,449 A | 10/1996 | Raskin et al. |
| 5,905,538 A | 5/1999 | Shuholm et al. |
| 6,081,339 A | 6/2000 | Southam et al. |
| 6,097,782 A | 8/2000 | Foroudi |
| 6,355,927 B1 | 3/2002 | Snyder |
| 6,396,052 B1 | 5/2002 | Barry et al. |
| 6,411,376 B1 | 6/2002 | Southam et al. |
| 6,563,108 B1 | 5/2003 | Stevens et al. |
| 6,577,985 B2 | 6/2003 | Scalf |
| 6,789,041 B1 | 9/2004 | Stephens |
| 2005/0111609 A1 | 5/2005 | Stephens |

* cited by examiner

BI-DIRECTIONAL SIGNAL CONVERTER

The present application is a continuation of U.S. patent application Ser. No. 10/143,500, filed May 7, 2002, now U.S. Pat. No. 6,789,041 entitled BI-DIRECTIONAL SIGNAL CONVERTER which claims priority under 35 U.S.C. § 119(e) to the filing of U.S. provisional application Ser. No. 60/289,702, filed May 8, 2001, by Stephens, for BI-DIRECTIONAL SIGNAL CONVERTER both of which are incorporated herein by this reference.

BACKGROUND OF THE INVENTION

The present invention relates to converting signals, and more particularly to conversion of bi-directional signals characterized in that the signal includes indicia corresponding to a distance, in time or position, and that a converted signal comprises further indicia corresponding to a non-integral multiple of the indicia.

By way of example, in machine tool and position indication applications, encoders (be they rotational, linear or the like) are used to indicate a position of a work piece or a machine part. It is often necessary, however, to convert the output of the encoders (or position indicators) from their fixed number of indicia per unit (e.g., fixed number of indicia per unit of rotation, fixed number of indicia per unit of length, or otherwise) to a number of indicia per unit that corresponds to some aspect of the work piece or machine tool position.

Industry standard rotary shaft encoders, for example, are manufactured with many different numbers of counts per revolution (in many different resolutions) in an attempt to cover the mechanical and precision needs of machine tool position indication applications. However, the resolutions are limited to integer values, i.e., whole numbers of counts per revolution, leaving one to select only a close match, rather than the precise number of counts per revolution desired, and then to use custom gear trains, or complex processor-based computational conversion systems, in order to obtain a desired number of counts per revolution For example, to generate a converted output comprising a count, i.e., a pulse, every 0.5000 inches on the perimeter of a 25.000 inch diameter drum, and whose shaft is mechanically coupled to a 1120 count per revolution, i.e., pulse per revolution, rotary shaft encoder, it is necessary to convert the pulse output of the rotary shaft encoder from a whole number of pulses per revolution to a non-integer number of pulses per revolution.

At the same time, however, for machine tool applications, the converted output must be accurate at various, and varying rotational speeds, as well as accommodate reversals in direction as, for example, the drum is rotated forward and backward at various and varying speeds.

The present invention addresses the needs above as well as others.

SUMMARY OF THE INVENTION

The present invention addresses the above and other needs by providing a converter for receiving an input signal that includes indicia corresponding to a distance, in time or position, and for generating a converted signal including further indicia corresponding to a non-integral multiple of the indicia.

The present invention can be characterized, in accordance with one embodiment, as a method having steps of providing a clock signal input and a direction signal input to a principal counter, and then incrementing a count value when a pulse is received by the clock signal input while the direction signal input is at a first value. The count value is decremented when a pulse is received by the clock signal input while the direction signal input is at a second value. A count pulse output is generated from the principal counter and the count value is set to a minimum coefficient when another pulse is received by the clock signal input after a maximum coefficient has been reached while the direction signal input is at the first value. A count pulse output is generated from the principal counter and the count value is set to the maximum coefficient when another pulse is received by the clock signal input after the minimum coefficient (which may be zero) has been reached while the direction signal input is at the second value. In this way, a converted signal is produced as the count pulse output of the principal counter.

In accordance with a further embodiment, the present invention may be characterized as a system. A plurality of cascaded counters may be chained together to reset the maximum coefficient of $N_1$ to $N_1+1$ and to reset the maximum coefficient to $N_1$ again for the principal counter. An output count signal of each counter is coupled to the clock signal input of respective next counter in the plurality of cascaded counters, with the exception of an output count signal of a last counter in the plurality of cascaded counters. The output count signal of the principle counter is coupled to the clock input signal of a first counter in the plurality of cascaded counters. The direction input signal is a direction input signal for each respective counter in the plurality of cascaded counters. Separate output signals are also activated at each respective counter in the plurality of cascaded counters once a maximum or minimum count value (minimum or maximum coefficient) is reached, which in turn activates, respectively, a count control or reload signal input of a previous counter in the plurality of cascaded counters to select whether a maximum coefficient for each respective counter in the plurality of cascaded counters is reset to $N_x$ or $N_x+1$.

In accordance with one variation, the minimum coefficient for each respective counter may be reset to $M_x+1$, and reset to $M_x$ instead of or in addition to the resetting of the maximum coefficient for each respective counter.

In accordance with yet a further variation, a count range, i.e., a difference between a minimum coefficient (starting value) and a maximum coefficient (rollover or "stopping" value) for each counter may be reset to $\Delta_x+1$., and reset to $\Delta_x$. The counters may count up or down as a function of the direction input signal.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE PREFERRED EMBODIMENTS

The following description is of the best mode presently contemplated for carrying out the invention. This description is not to be taken in a limiting sense, but is made merely for the purpose of describing the general principals of the invention. The scope of the invention should be determined with reference to the claims.

Figure 1:
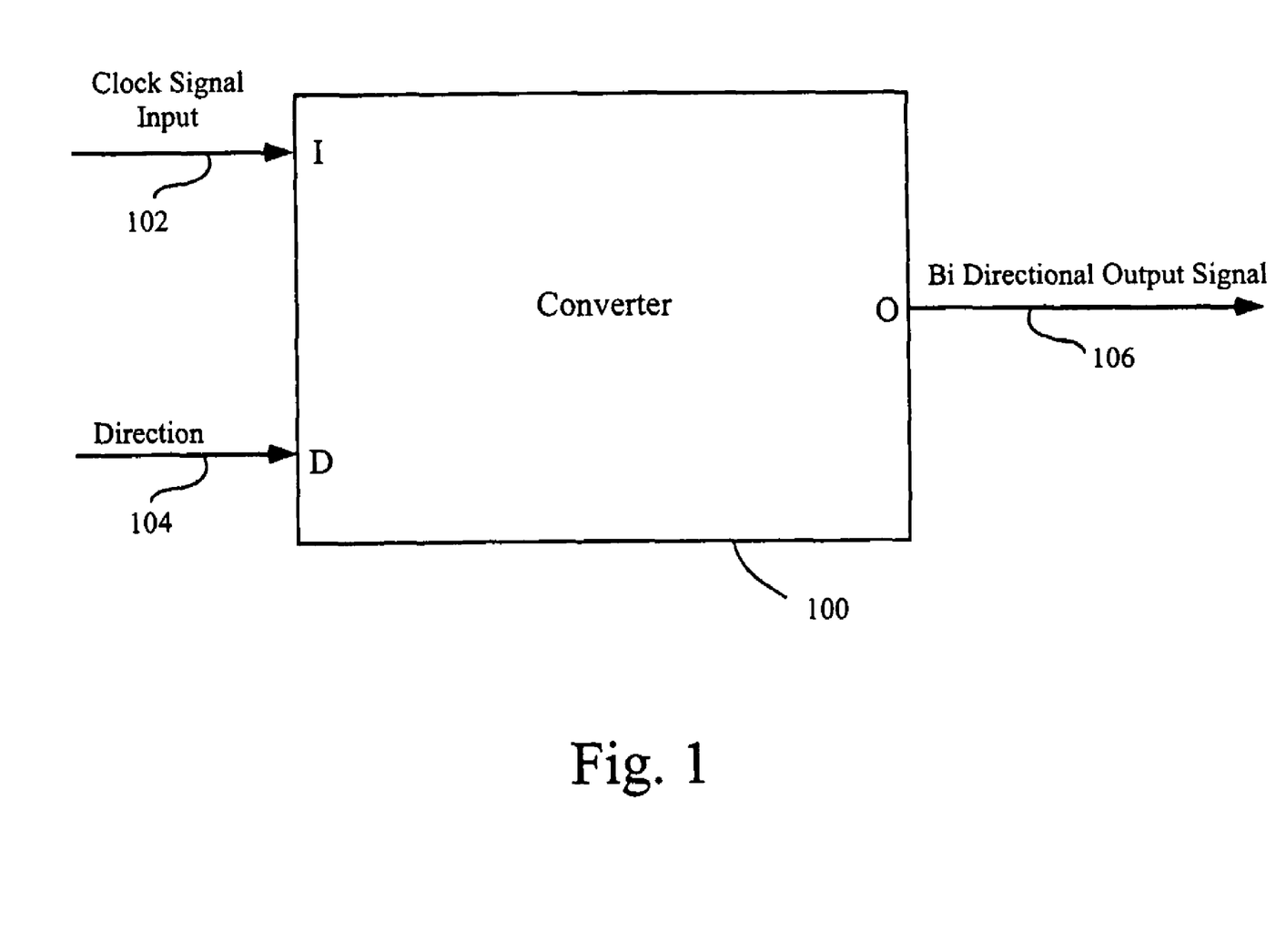
FIG. 1 is a block diagram of a converter for converting a bi-directional input signal to an output signal that is a non-integral multiple of the input signal.

Referring to FIG. 1, shown is a block diagram of a converter 100 for converting a bi-directional input signal to an output signal 106 that, averaged over time, is a non-integral multiple of the input signal.

Shown is a converter 100 having a clock signal input (I) 102, a direction signal input (D) 104, and a signal output (0) 106.

The clock signal input (I) 102 and direction signal input (D) 104 are coupled to a bi-directional input signal pair, such as an output signal pair from a rotary shaft encoder. In operation, the converter 100 converts the clock signal input (I) 102 to signal output (0) 106 that is a non-integral multiple of the clock signal input (I) 102 by alternately counting of the clock signal input (I) 102 pulses and generating a signal output (O) 106 pulse each time an integer number, (N) or (N+1) respectively, of such clock signal input (I) 102 pulses is counted. Counting by the integer number, (N) or (N+1), is performed in such a ratio as to obtain a non-integral multiple number of output signal (O) 106 pulses. The integers N and N+1 are hereafter referred to as maximum coefficients or maximum coefficient pairs, although it will be appreciated by one of ordinary skill in the art that minimum coefficient pairs may also or alternatively be employed. The output signal (O) 106 generated is thus advantageously a non-integral multiple of the clock signal input (I) 102.

The direction signal input (D) 104 indicates to the converter whether the converter 100 is to count up or down with each clock signal input (I) 102 pulse until reaching a zero (or a minimum coefficient) or one of the maximum coefficients, (N) or (N+1).

Figure 2:
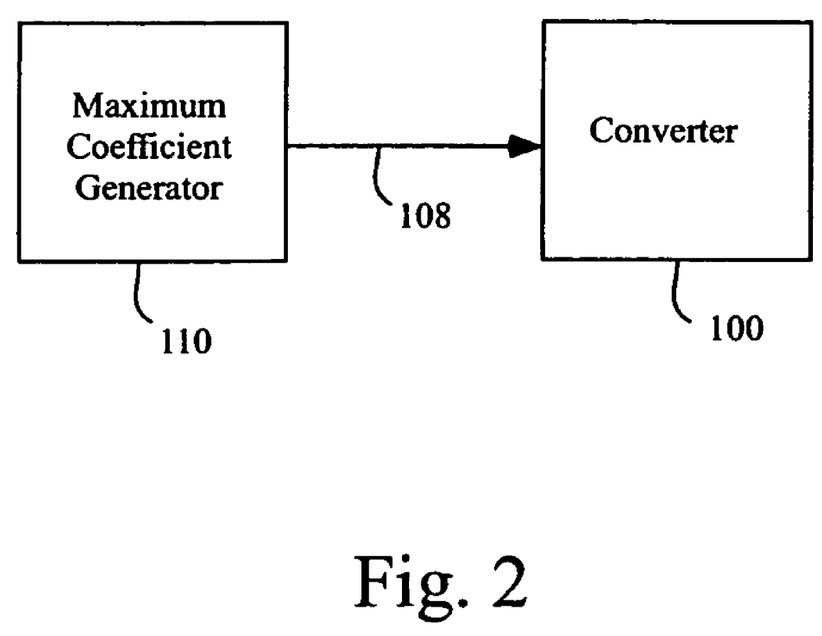
FIG. 2 is a block diagram of a generator (which may include a computer program operating on a general or special purpose computer) for generating maximum (or minimum) coefficients used in a converter, such as the converter of FIG. 1, and the converter for converting a bi-directional input signal to a bi-directional output signal that is a non-integral multiple of the input signal as a function of the maximum (or minimum) coefficients having been generated.

Referring next to FIG. 2, shown is a block diagram of a generator 110 for generating maximum coefficients ($N_1$) and ($N_1$+1) used in a converter, such as the converter 100 of FIG. 1, and the converter 100 for converting the bi-directional input signal pair (made up of the clock signal input (I) 102 and the direction signal input (D) 104) to a the signal output (O) 106 that is a non-integral multiple of the clock signal input (I) 102 as a function of the maximum coefficients (N) and (N+1) having been generated.

Shown is the maximum coefficient generator 110 having a maximum coefficients output 108 coupled to an input of the converter 100.

During a programming, design or manufacturing step the maximum coefficients are calculated within the maximum coefficient generator 110 and loaded by the maximum coefficient generator 110. The specific calculation method according to a preferred embodiment is described hereinbelow.

Figure 3:
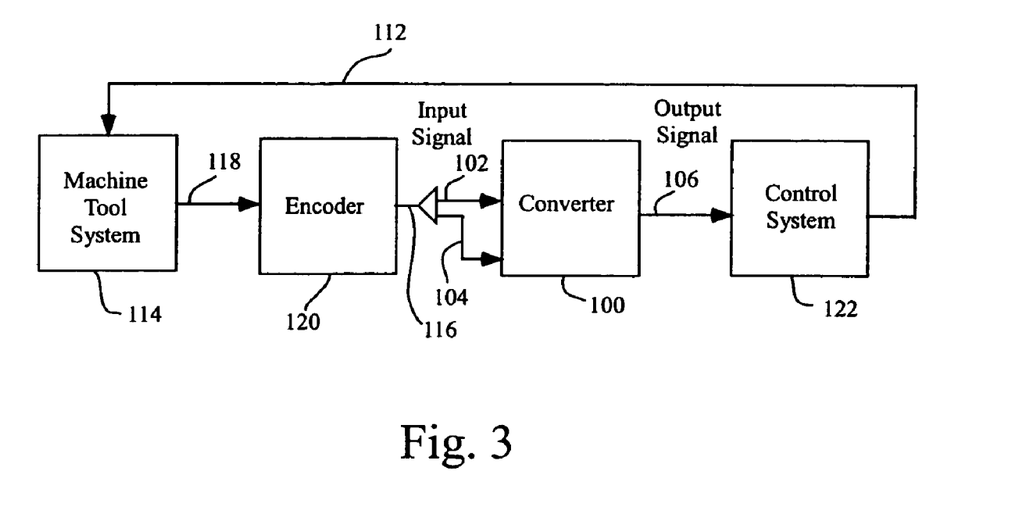
FIG. 3 is a block diagram of a machine tool system (or other similar system including a position encoder, a mechanical subsystem, and a control subsystem) in which a converter, such as in FIG. 1, converts a bi-directional input signal (from the position encoder) to a bi-directional output signal that is a non-integral multiple of the bi-directional input signal.

Referring next to FIG. 3, shown is a block diagram of a machine tool system 114 (or other similar system including a position encoder, a mechanical subsystem, and a control subsystem) in which a converter 100, such as in FIG. 1, converts a bi-directional input signal 116 (from the position encoder 120) to a bi-directional output signal 106 that is a non-integral multiple of the bi-directional input signal 116.

Shown is a machine tool system 114 having an output 118 mechanically coupled to the input of an encoder 120. For example, the encoder 120 may be an encoder, such as a rotary shaft encoder or linear encoder, that produces signal, such as a train of encoder pulses, related to a position of the machine tool system 114. The encoder 120 has an output 116 coupled to the inputs 102, 104 of a converter 100. The converter 100 in turn has an output 106 coupled to the input of a control system 122 whose output feeds back to the machine tool system 114.

In operation, the machine tool system 114 outputs an initial position 118 to the encoder 120 through a mechanical coupling. The encoder then provides a bi-directional signal 116, with direction and position indicia information, to a direction signal input 104 and a clock signal input 102 to the converter 100. Output from the converter 100 is a converted bi-directional signal 106 that is then fed into a control system 122. Finally, the control system provides a control signal 112 to the machine tool system 114 so that it may, for example, mark positions on a work piece at a desired interval.

Figure 4:
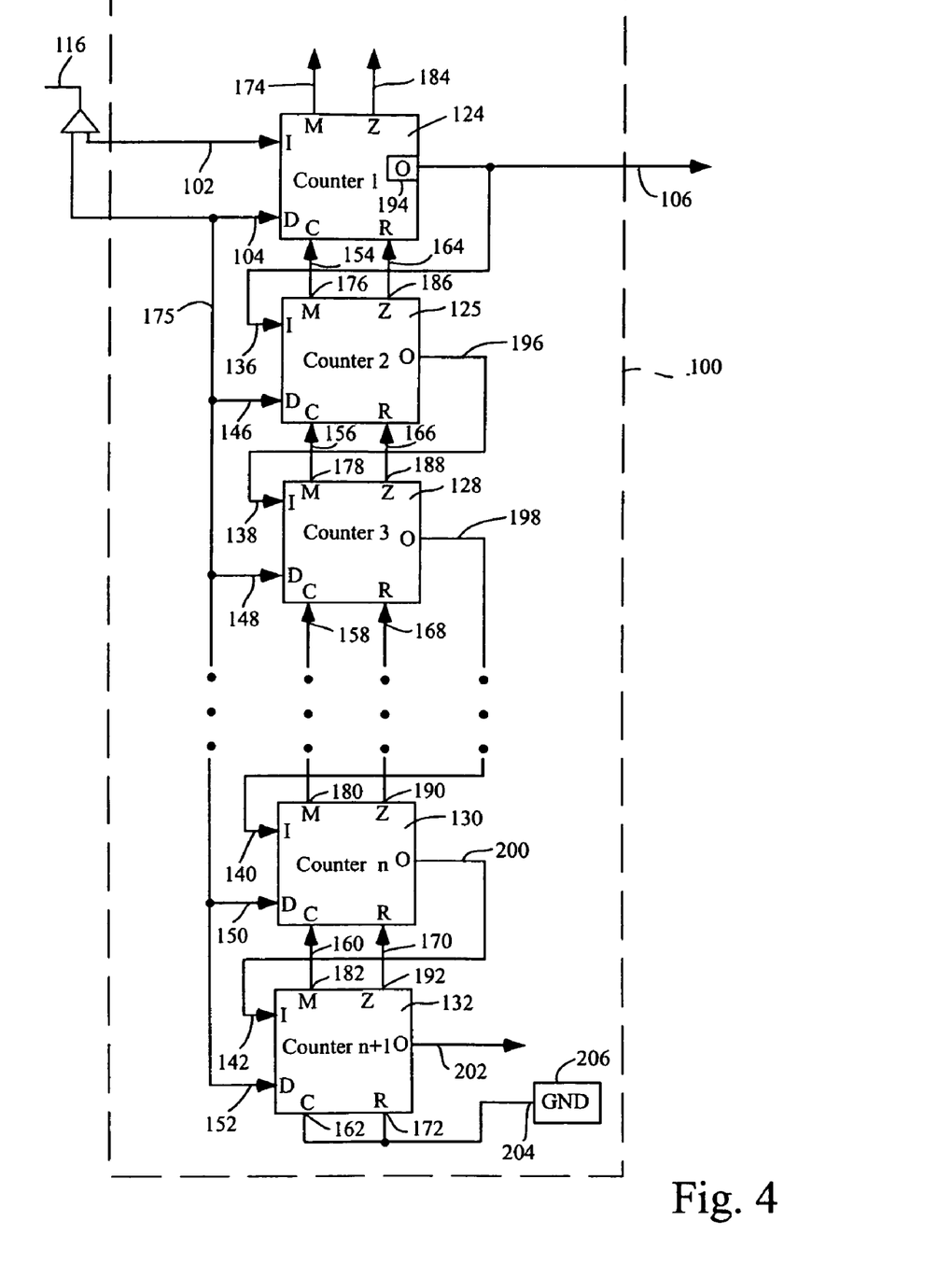
FIG. 4 is a detailed block diagram of a converter, such as in FIG. 1, in which a plurality of counters are employed to convert a bi-directional input signal into a bi-directional output signal that is a non-integral multiple of the bi-directional input signal.

Referring next to FIG. 4, shown is a detailed block diagram of a converter 100, such as in FIG. 1, in which a plurality of counters (counter 1 124 through counter n+1 132) are employed to convert a bi-directional input signal 116 into a bi-directional output signal 106 that is a non-integral multiple of the bi-directional input signal 116.

Shown is a chain of counters (counter 1 124 through counter n+1 132), each counter having a clock signal input (I) 102, 136, 138, 140, 142, a direction signal input (D) 104, 146, 148, 150, 152, a count control signal input (C) 154, 156, 158, 160, 162, a reload signal input (R) 164, 166, 168, 170, 172, a maximum count signal output (M) 174, 176, 178, 180, 182, a count zero signal output (Z) 184, 186, 188, 190, 192, and a count pulse output (O) 194, 196, 198, 200, 202. The clock signal input 102 and direction signal input 104 are coupled to a bi-directional input signal pair 102, 104 as shown in FIG. 1, from which position indicia and direction information are obtained. The direction signal input (D) 104 (FIG. 1) is the direction signal input (D) 146, 148, 150, 152 for each counter (counter 1 124 through counter n+1 132, with all such direction signal inputs (D) 146, 148, 150, 152 receiving the same direction signal. The count pulse outputs (O) 194, 196, 198, 200 of counter 1 124 through counter n 130 are the clock signal input (I) of a directly subsequent counter. Finally, the count control signal inputs (C) 154, 156, 158, 160 and the reload signal inputs (R) 164, 166, 168, 170 of counter 1 124 through counter n 130 are respectively the maximum count signal output (M) 176, 178, 180, 182 and the count zero signal output (Z) 186, 188, 190, 192 of the directly subsequent counter. The count control signal input 162 and the reload signal input 172 of the last counter 132 are electrically connected 204 to ground 206 to he held in a known state.

In accordance with a particular embodiment, the last counter 132 may be simplified by eliminating the count control signal input 162 and the reload signal input 204, as these inputs are not used in the last counter 132. This particular embodiment is advantageous, for example, when the converter 100 is implemented either in part or entirely using software or programming on a programmable device, such as a programmable logic device or the like, or a general or special purpose processing device, such as a general or special purpose computer. By eliminating the count control signal input 162 and the reload signal input 204 (and simultaneously eliminating the accompanying functionality from the last counter 132) logic resources can be conserved, thus smaller and less expensive logic devices may be employed.

The last counter 132 has a single maximum coefficient, instead of a pair of maximum coefficients.

In operation, multiple counters (counter 1 124 through counter n+1 132) are cascaded together to alter the ratio of $N_1$ to $N_1$ as the maximum coefficient for counter 1 124. When counter 1 124 generates a count pulse output 106, it also appears as the clock pulse input 136 of counter 2 126, thereby incrementing or decrementing its respective count value, depending on whether the direction signal input 104 is at a first or second value indicating to either count up or down. So it is with subsequent counters (counter 2 124 through counter n 130) as each generates a count pulse output the subsequent counter receives a clock pulse input. As each subsequent counter (counter 2 125 through counter n+1 132) reaches zero or its respective maximum coefficient, it will activate either the respective count zero signal output (Z) 186, 188, 190, 192 or the respective maximum count signal output (M) 178, 180, 182 that is then received respectively by the respective reload signal input (R) 164, 166, 168, 170 or the respective count control signal input (C) 154, 156, 158, 160 of the previous counter. This scheme operates to select whether $N_n$ or $N_n+1$ will be the current maximum coefficient for the respective counter (n). As each subsequent counter (counter 2 126 through counter n+1 22) reaches zero or its respective maximum coefficient, it will activate either the respective count zero signal output (Z) 186, 188, 190, 192 or the respective maximum count signal output (M) 178, 180, 182 that is then received respectively by the respective reload signal input (R) 164, 166, 168, 170 or the respective count control signal input (C) 154, 156, 158, 160 of the previous counter. This scheme operates to select whether $N_n$ or $N_n+1$ will be the current maximum coefficient for the respective counter (n).

Additionally, there is a preset and reset capability. Thus, the conversion process may be altered by either resetting all the count values for each counter (counter 1 124 through counter n+1 22) to start over at zero or by presetting the count value for each counter (counter 1 124 through counter n+1 22) to be a specific initial count value.

Figure 5:
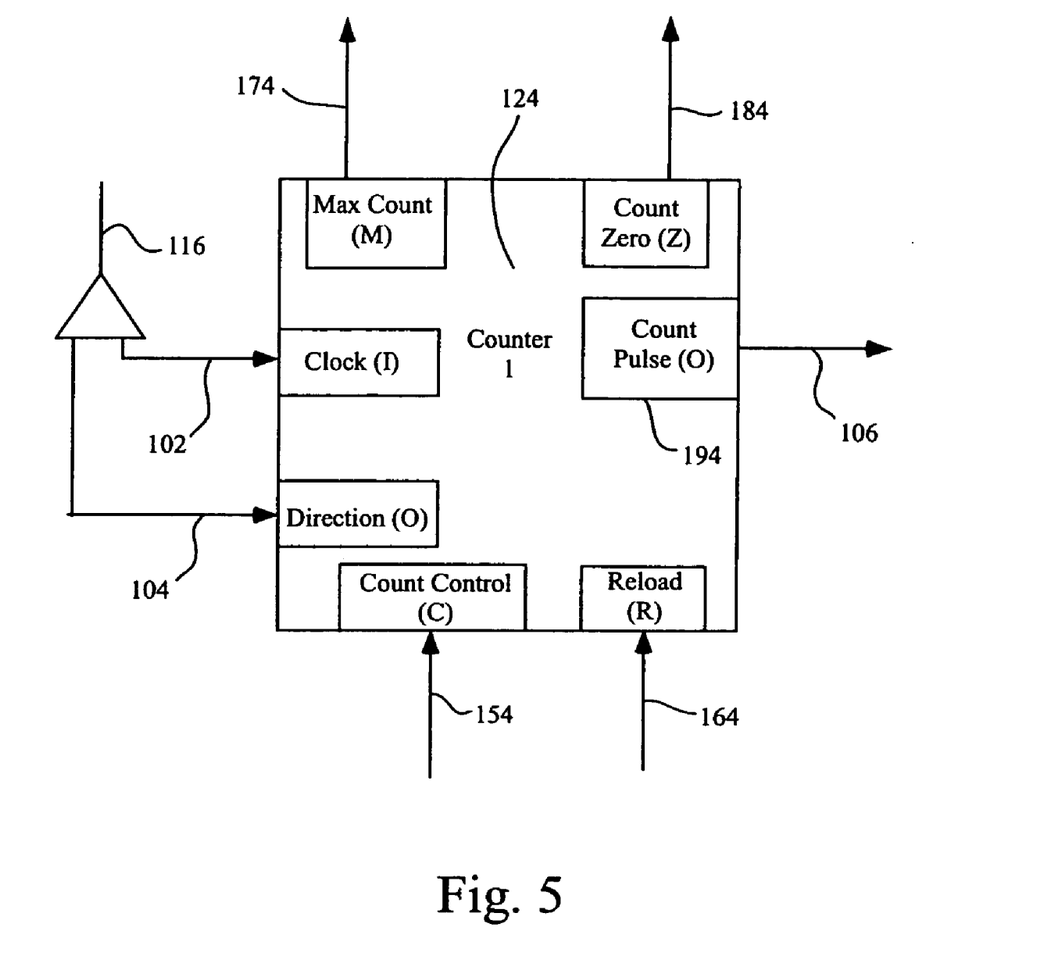
FIG. 5 is a block diagram of a counter, such as may be employed as one of the counters of FIG. 4.

Referring next to FIG. 5, shown is a block diagram of a counter, such as may be employed as one of the counters of FIG. 4. Shown is a counter 124 having a clock signal input (I) 102 a direction signal input (D) 104 a count control signal input (C) 154 a reload signal input (R) 164 a maximum count signal output (M) 174 a count zero signal output (Z) 184 and a count pulse output (0) 194.

The clock signal input 102 and direction signal input 104 are coupled to a bi-directional input signal pair as shown in FIG. 1 , from which the position indicia and direction information are obtained. The count control signal input (C) 154 and reload signal input (R) are coupled to the maximum count signal output (M) 176 and count zero signal output (Z) 186 of a subsequent counter such as counter 2 126 of FIG. 4.

In operation, when a pulse is received from the clock signal input 102 a count value for counter 1 124 is either incremented or decremented depending on whether the direction signal input 104 is in a first state or a second state, e.g., low or high. For example, if the direction signal input 104 is low, the count value is incremented; if it is high, then the count value is decremented. When the direction signal input 104 is low, and thus the count value is to be incremented, a count control signal input 154 is used to select whether the maximum coefficient for counter 1 124 will be $N_1$ or $N_1+1$. It is assumed at this point the sets of initial maximum coefficients (N and N+1) for all the counters (counter 1 124 through counter n+1 22) have been previously calculated and loaded during manufacture, as shown in FIG. 2.

When the count control signal input 154 is in a first state, e.g., low, the maximum coefficient is N. When the count control signal input 154 is in a second state, e.g., high, then the maximum coefficient is N+1. When the direction signal input 104 is high, and thus the count value is to be decremented, a reload signal input 164 is used to select whether to reload the count value with N or N+1 after a count value of zero has been reached.

When the reload signal input 164 is in a first state, e.g., low , the count value will be reloaded with N. When the reload signal input 164 is in a second state, e.g., high, then the count value will be reloaded with N+1.

If the direction signal input 104 is in a first state (e.g., low or not asserted) when the count value reaches the maximum coefficient for counter 1 124 (either N or N+1 depending on the count control signal input 154) then a maximum count signal output 174 is asserted. On the next clock signal input pulse 102 a count pulse output 194 is generated from counter 1 124, the count value is reset to zero and a count zero signal output 184 is asserted, and the maximum count signal output 174 is not asserted. If the direction signal input 104 is, e.g., asserted when the count value reaches zero, the count zero signal output 184 is also e.g., asserted. Likewise, on the next clock signal input pulse 102 a count pulse output 106 is generated from counter 1 124, but this time the count value is reloaded with N or N+1 depending on the count control signal input 154, and the maximum count signal output 174 is asserted.

The final output of the circuit is a bi-directional output signal 106 resulting from the train of count pulse outputs 194 that is a non-integral multiple of the input signal 116. This results due to the process of using a ratio of maximum coefficients (N and N+1) for conversion as a function of the desired non-integral multiple.

Figure 6:
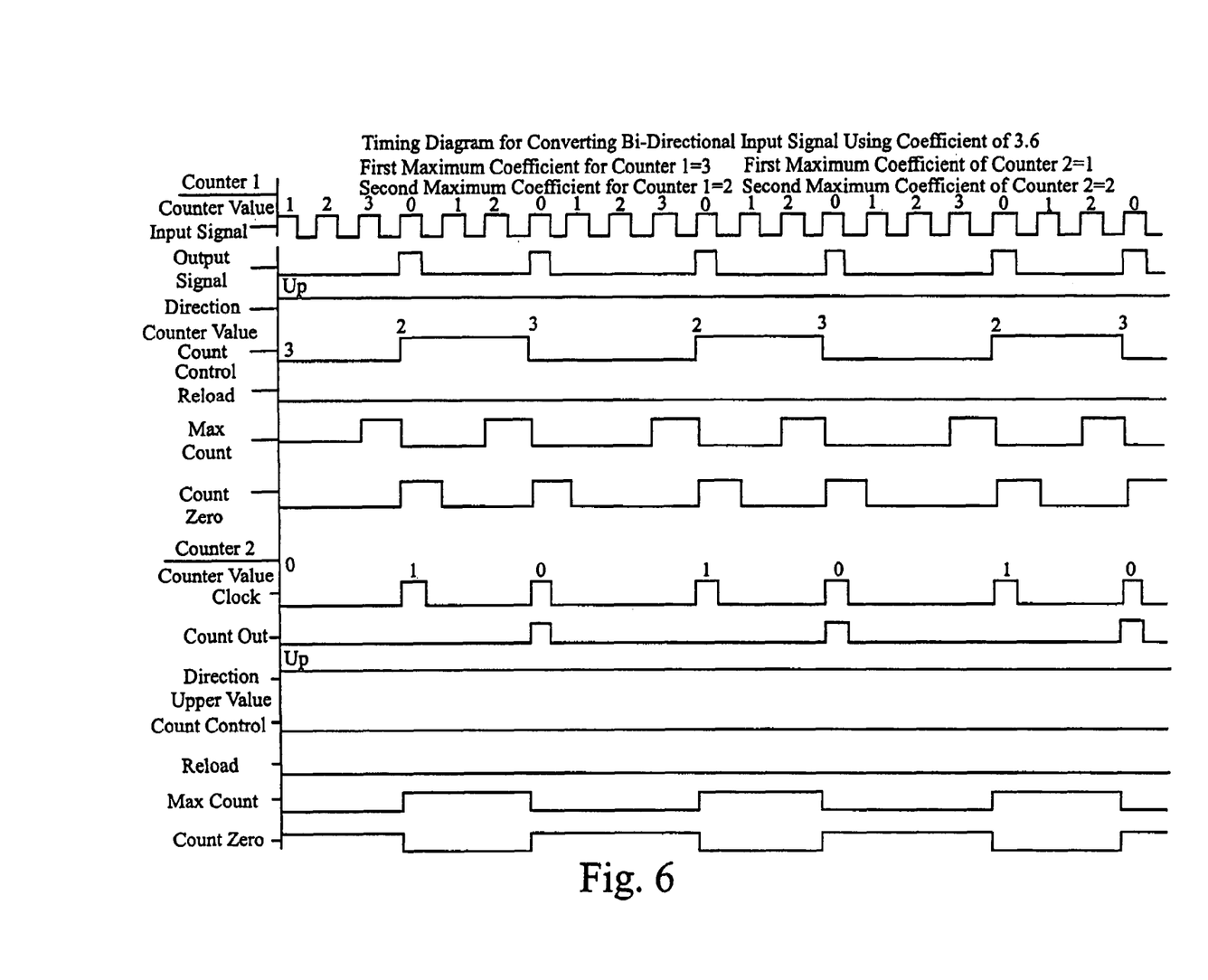
FIG. 6 is a timing diagram showing an example of a bi-directional input signal, intermediate signals generated in the converter of FIG. 4, and the bi-directional output signal that is a non-integral multiple of the bi-directional input signal.

Referring next to FIG. 6, shown is a timing diagram presenting an example of a bi-directional input signal, intermediate signals generated in the converter of FIG. 4, and the bi-directional output signal that is a non-integral multiple of the bi-directional input signal.

The example uses two counters with a desired non-integral multiple of 3.6 input pulses per output pulse. Each counter has a set of maximum coefficients and the values of the bi-directional input signal, bi-directional output signal, direction signal input, counter value, count control signal input, reload signal input, maximum count signal output and count zero signal output are shown for each counter over time. Referring now again to FIG. 4, more complex conversion ratios require more counters (counter 1 124 through counter n+1 132) in the converter 100, but in most cases ten or less have been found to be quite adequate. An error value can define the accuracy of a given converter 100 by measuring how far the actual output of the converter 100 will deviate from the desired (or ideal) output or average each time the principal (or first) counter 124 in the converter 100 generates the signal. If this error value equals zero, then no additional counters are needed, as the deviation from the desired (or ideal) output will not drift. Generally, however some drift or error from the desired output will occur (depending on the non-integral multiple desired), and a number of counters is selected in order to reduce this en-or to a tolerable level for the application to which the present embodiment is being applied.

Figure 7:
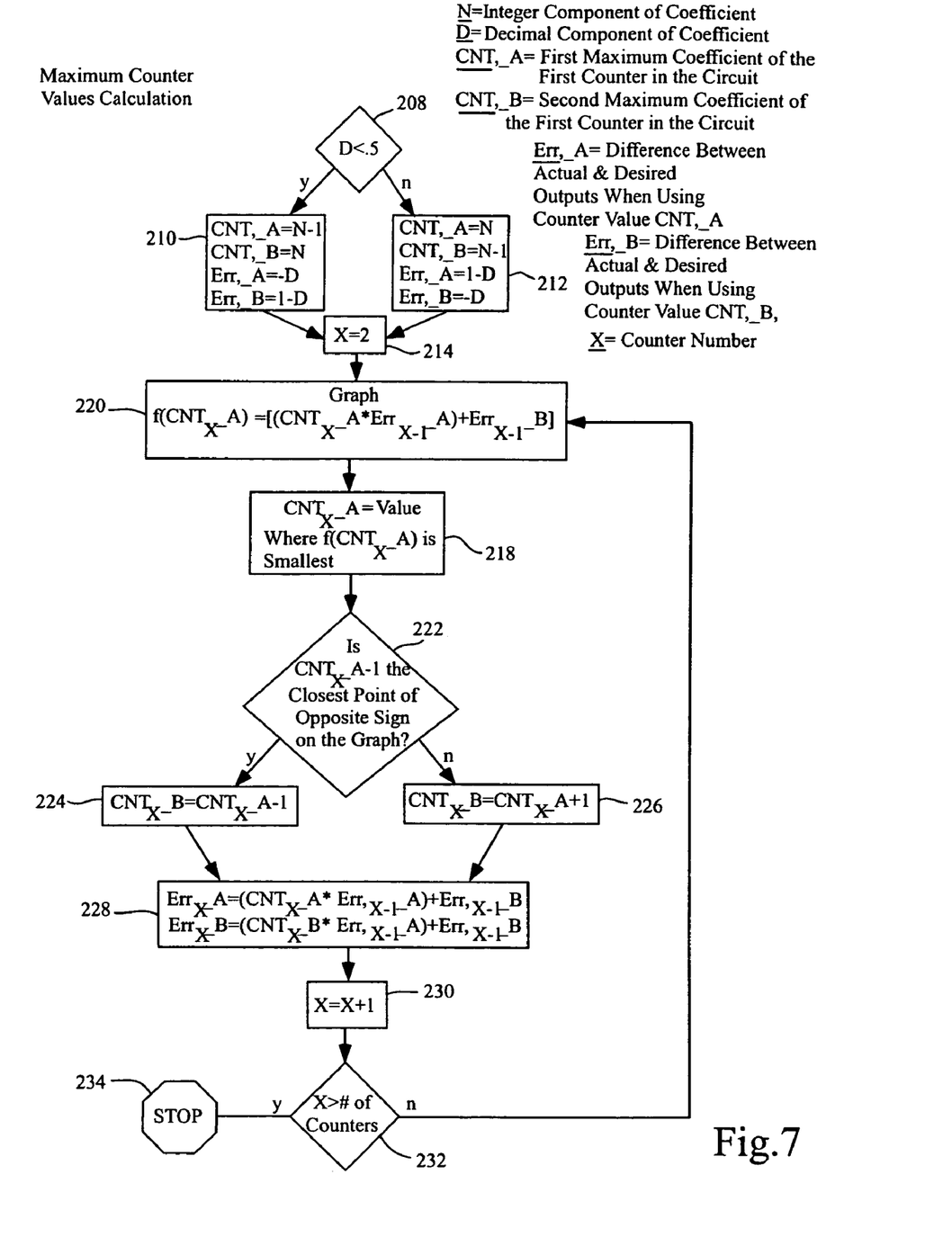
FIG. 7 is a flow chart showing steps traversed by the generator of FIG. 2 in generating coefficients used in a converter.
Figure 8:
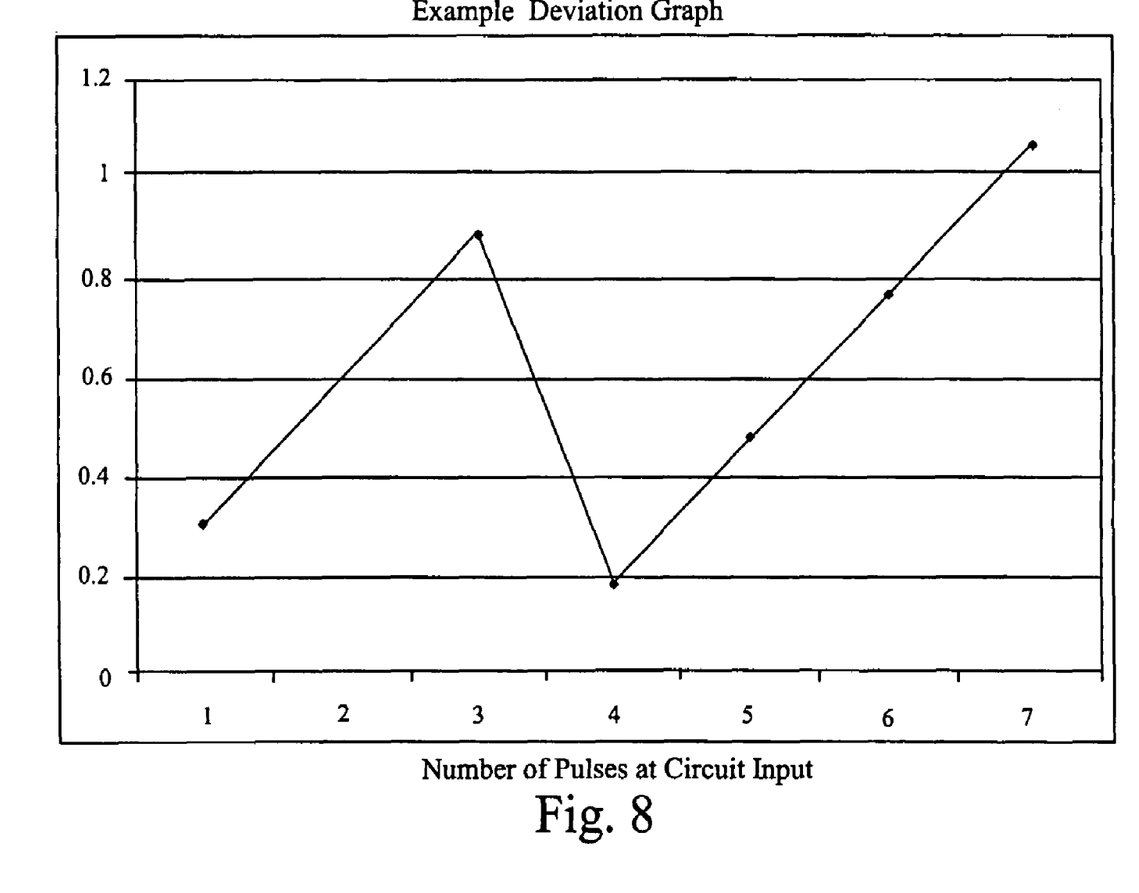
FIG. 8 is an exemplary deviation graph showing deviation of a bi-directional output signal, such as is generated by one embodiment of the converter of FIG. 4 having 2 counters, as compared to a desired (or ideal) bi-directional output signal over seven input pulses to the converter.
Figure 9:
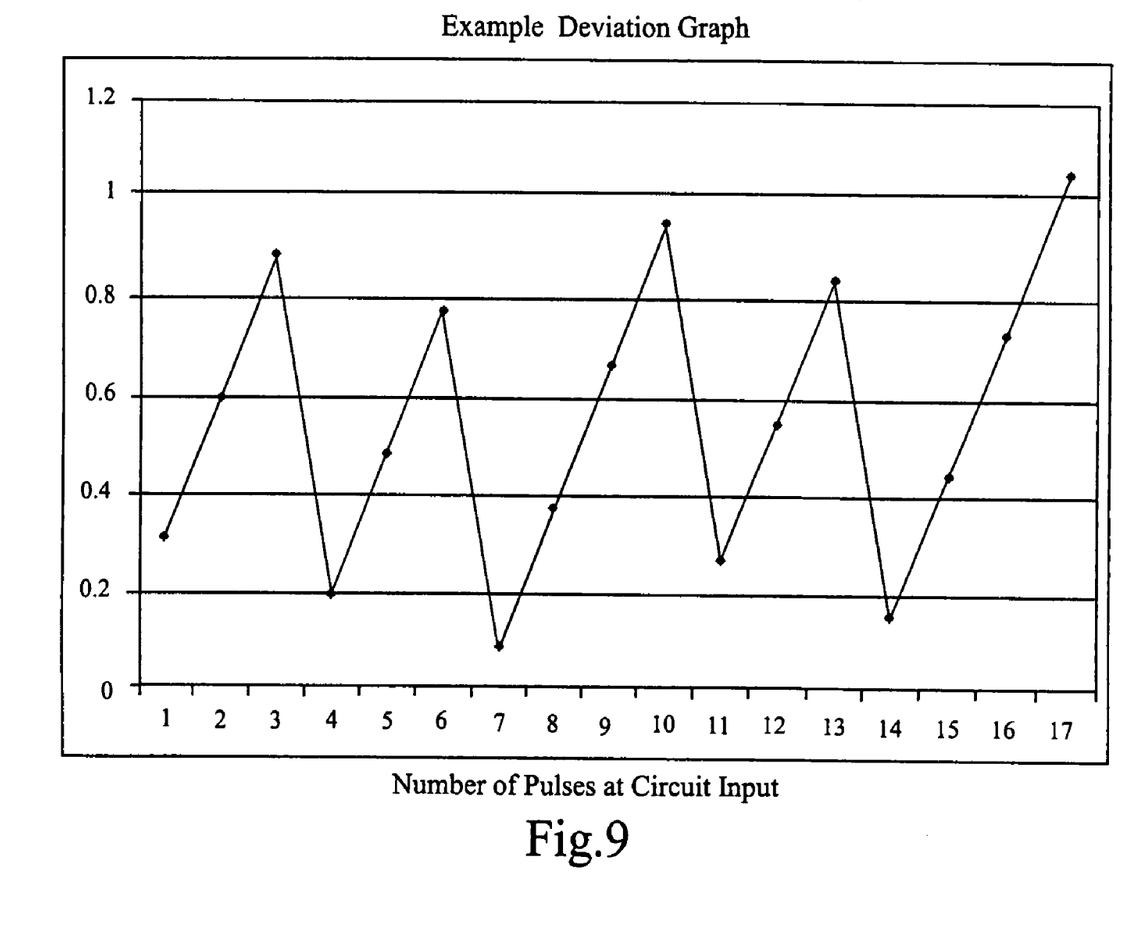
FIG. 9 is an exemplary deviation graph showing deviation of a bi-directional output signal, such as is generated by one embodiment of the converter of FIG. 4 having 3 counters, as compared to a desired (or ideal) bi-directional output over 17 input pulses to the converter.
Figure 10:
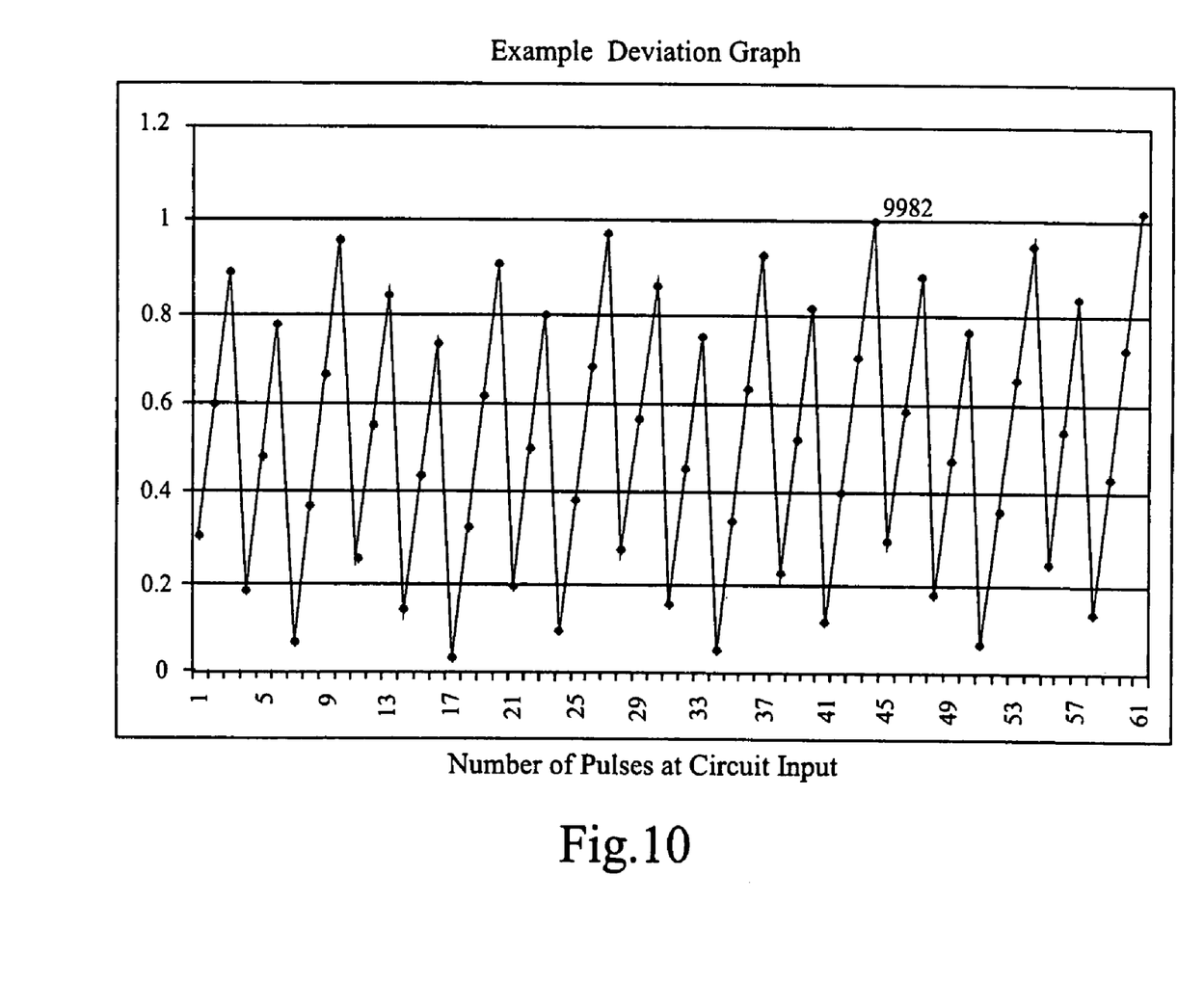
FIG. 10 is an exemplary deviation graph showing deviation of a bi-directional output signal, such as is generated by one embodiment of the converter of FIG. 4 having 4 counters, as compared to a desired (or ideal) bi-directional output over 61 input pulses to the converter.
Figure 11:
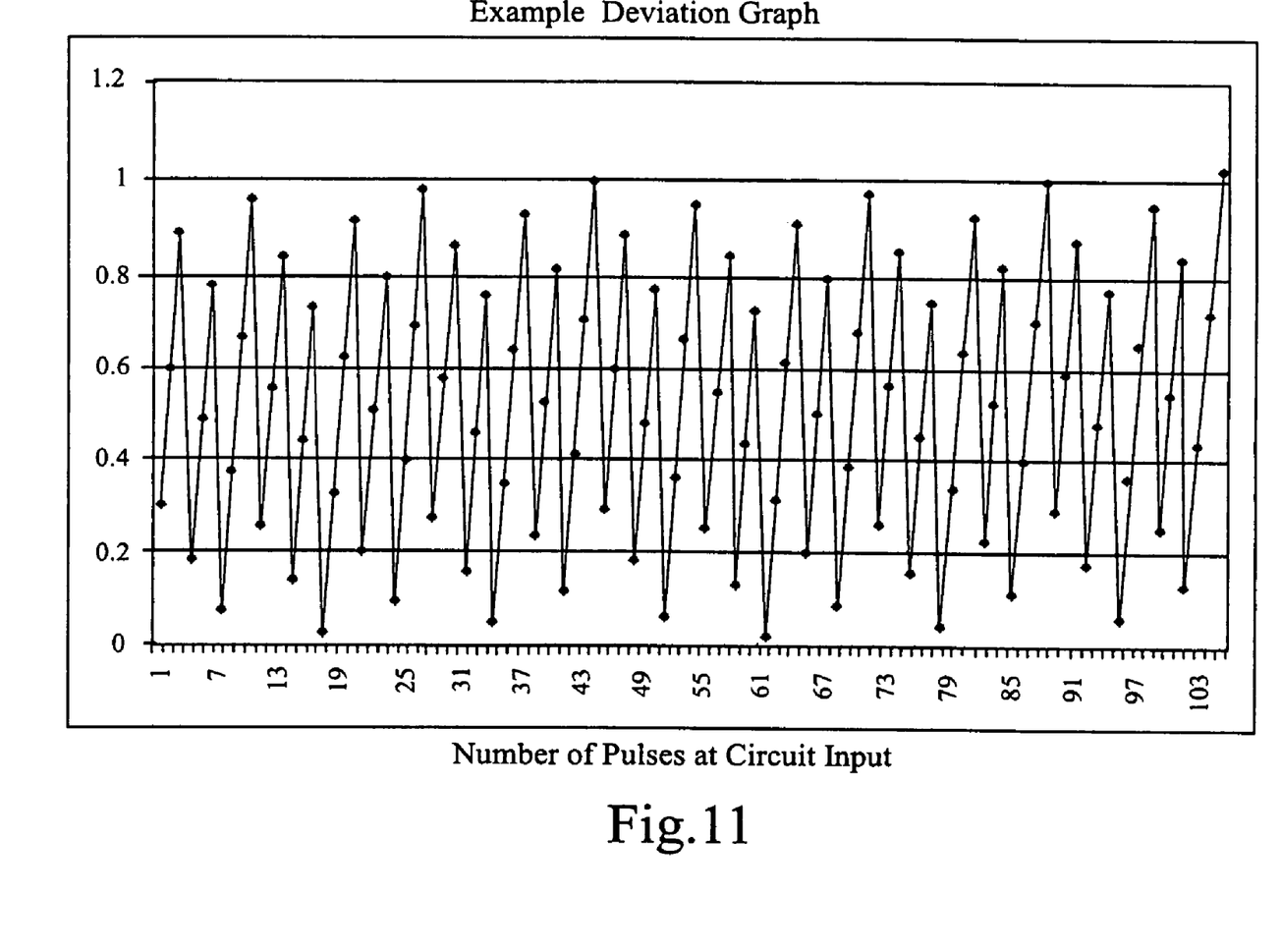
FIG. 11 is an exemplary deviation graph showing deviation of a bi-directional output signal, such as is generated by one embodiment of the converter of FIG. 4 having 5 counters, as compared to a desired (or ideal) bi-directional output over 103 input pulses to the converter.

Referring next to FIG. 7, shown is a flow chart that shows steps traversed by the generator of FIG. 2 in generating coefficients used in a converter. Given a non-integral multiple consisting of an integer component and a decimal component a pair of integer maximum coefficients can be generated for each counter in the converter, which when applied to the aforementioned converter 100, provide a very accurate means of producing the signal output 106 that is a non-integral multiple of the signal input 116. First, the non-integral multiple is broken into the integer and decimal portion 208. Then different formulas 210, 212, based on the defined variables as shown in FIG. 7, are used to calculate a pair of maximum coefficients, and error values for counter 1 124 in the converter 100 as a special case. A variable $X_{max}$ is set 214 to the total number of counters in the converter 100. Once this is complete, the pairs of maximum coefficients for the subsequent counters are determined by numerical or graphical analysis 218, 222, 224, 226 based on the function or graph of a function 220 of the pair of maximum coefficients and error values determined previously for the first counter in the converter 100. More particularly, $CNT_x\_A$, which is the first maximum coefficient for counter x, is set to a value that makes the function $f(CNT_x\_A)$ 220 the smallest 218. Then it is determined whether $CNT_x\_-A$ is the closest point of opposite sign on the graph 222. If it is, then $CNT_x\_B$, which is the second maximum coefficient for counter x, is set to $CNT_x\_A-1$ 224. If not, then $CNT_x\_B$ is set to $CNT_x\_A+1$ 226. Then, the error values are calculated 228 according to the formulas shown in FIG. 7 for use in determining the pair of maximum coefficients $(N_x)$ and $(N_x+1)$ for the next counter in the converter. The pairs of maximum coefficients $(N_x)$ and $(N_x+1)$ are determined sequentially, in that each pair of maximum coefficients $(N_x)$ and $(N_x+1)$ is based on the previous pair of maximum coefficients $(N_{x-1})$ and $(N_{x-1}+1)$. Thus, if there are more counters 230, 232 the numerical or graphical analysis 220, 218, 222, 224, 226 is repeated until there are no more pairs of maximum coefficients left to determine 234. The method described above is embodied in software running on a computer, but may also be implemented in hardware logic. The output of the generator 110 (FIG. 2) may he in the form of programming which implements the counters described herein using a processor or logic device, such as a programmable logic device, such as is available as part no. M4A5 from Lattice Semiconductor of Oregon (www.latticesemi.com).

Referring next to FIGS. 8, 9, 10 and 11, shown are exemplary deviation graphs showing deviation of a bi-directional output signal, such as is generated by the converter 100 of FIG. 4, as compared to a desired (or ideal) bi-directional output signal respectively over seven, 17, 61 and 103 input pulses to the converter 100. The actual value deviates from the desired (or ideal) by no more than 1 for at least a prescribed distance, i.e., number of input pulses, (as a function of the error values, described above), and therefore the accuracy of the circuit is dependant upon the resolution of the bi-directional input signal 116 (FIGS. 1, 3, 4, 5) and hence also the clock signal input 102 (FIGS. 3, 4, 5). Whereas a very low-resolution signal will suffer from less accuracy (at any given distance), it has been found that in most mid-resolution position transducers the error in average signal output is negligible, i.e., the prescribed distance is very long. For example, converting an incoming signal from a 5,000 count per revolution optical encoder to 92.56473196458 counts per revolution using a converter 100 as described above counters 124 will result in an error in average signal output to within 0.072 degrees from the desired value for $2.496446393322 * 10^{12}$ cycles. This translates into running constantly for 1.9 years at 1,000 rotations per minute (rpm).

While the invention herein disclosed has been described by means of specific embodiments and applications thereof, numerous modifications and variations could be made thereto by those skilled in the art without departing from the scope of the invention set forth in the claims.

What is claimed is:

1. A method for converting signals comprising:
   receiving a count corresponding to a predetermined distance as a position signal input to a converter;
   receiving direction indicia as a direction signal input to the converter; and
   converting the position signal input and the direction signal input to a converted signal that is on average a non-integral multiple of the position signal input, the converted signal being a signal that indicates a change in position of a movable part.

2. The method according to claim 1 wherein converting the position signal input and the direction signal input comprises:
   incrementing a count value in the event the count is generated while the direction signal input is at a first value;
   decrementing the count value in the event the count is generated while the direction signal input is at a second value;

generating a count output from the converter and resetting the count value to zero when another count is generated after a maximum number of counts has been reached while the direction signal input is at the first value; and generating a count output from the converter and resetting the count value to the maximum number of counts when another count is generated after a count value of zero has been reached while the direction signal input is at the second value.

3. The method according to claim 2 wherein converting the position signal input and the direction signal input further comprises:

activating a maximum count signal output of the converter when the maximum number of counts has been reached; and activating a count zero signal output of the converter when the count value of zero has been reached.

4. The method according to claim 2 wherein converting the position signal input and the direction signal input further comprises:

receiving a count control signal input into the converter;

receiving a reload signal input into the converter;

setting the maximum number of counts to a first maximum value in a set of maximum number of counts when either the count control signal input becomes active or the reload signal input becomes active; and setting the maximum number of counts to a second maximum value in the set of maximum number of counts when either the count control signal input becomes inactive or the reload signal input becomes inactive.

5. The method according to claim 3 wherein converting the position signal input and the direction signal input further comprises:

receiving a count control signal input into the converter;

receiving a reload signal input into the converter;

setting the maximum number of counts to a first maximum value in a set of maximum number of counts when either the count control signal input becomes active or the reload signal input becomes active; and setting the maximum number of counts to a second maximum value in the set of maximum number of counts when either the count control signal input becomes inactive or the reload signal input becomes inactive.

6. The method according to claim 5 wherein the converter is a first converter, the method further comprising chaining a plurality of additional converters subsequent to the first converter thereby creating a combined converter, wherein the direction signal input is a direction signal input for each converter of the combined converter, wherein a converted signal from each converter of the combined converter is an input to a directly subsequent converter of the combined converter, and wherein a count control signal input and a reload signal input of each converter of the combined converter are respectively a maximum count signal output and a count zero signal output of a directly subsequent converter of the combined converter.

7. The method according to claim 6 further comprising resetting count values for each converter of the combined converter to a zero value when a selection is made to do so.

8. The method according to claim 6 further comprising setting count values for each converter of the combined converter to a specific initial count value when a selection is made to do so.

9. The method according to claim 6 further comprising:

determining the set of maximum number of counts for the first converter within the combined converter as a special case;

determining a set of error values for the first converter as the special case; and determining additional sets of maximum number of counts and additional sets of error values sequentially for each converter of the plurality of additional converters by graphical analysis of a function of the set of maximum number of counts and the set of error values of a previous converter of one of the plurality of additional converters.

10. The method according to claim 8 further comprising:

determining the set of maximum number of counts for the first converter within the combined converter as a special case;

determining a set of error values for the first converter as the special case; and determining additional sets of maximum number of counts and additional sets of error values sequentially for each converter of the plurality of additional converters by graphical analysis of a function of the set of maximum number of counts and the set of error values of a previous converter of one of the plurality of additional converters.

11. The method according to claim 8 wherein the specific initial count value is zero.

12. A method for converting signals comprising:

receiving direction indicia and position indicia corresponding to a distance as an input to a converter;

generating a distance count each time the position indicia corresponds to a predetermined distance;

changing a distance count value when the distance count is generated as a function of the position indicia;

generating a count output signal from the converter and resetting the distance count value to zero when another distance count is generated after a maximum number of distance counts has been reached while a direction signal input is at a first direction value, wherein the direction signal input is a function of the direction indicia;

generating a count output signal from the converter and resetting the distance count value to the maximum number of distance counts when another distance count is generated after a distance count value of zero has been reached while the direction signal input is at a second direction value;

activating a maximum count signal output of the converter when the maximum number of distance counts has been reached;

activating a count zero signal output of the converter when the distance count value of zero has been reached;

receiving a count control signal input into the converter;

receiving a reload signal input into the converter;

setting the maximum number of distance counts to a first maximum value in a set of maximum number of counts when either the count control signal input becomes active or the reload signal input becomes active; and setting the maximum number of distance counts to a second maximum value in the set of maximum number of counts when either the count control signal input becomes inactive or the reload signal input becomes inactive.

13. The method according to claim 12 wherein the converter is a first converter, the method further comprising chaining a plurality of additional converters subsequent to the first converter thereby creating a combined converter, wherein each of the plurality of additional converters is adapted to receive another count control signal input and another reload signal input, wherein each of the plurality of additional converters is further adapted to generate another count output, wherein the direction indicia is an input to each of the plurality of additional counters, wherein the count output from each converter of the combined converter is an input to a directly subsequent converter of the combined converter, and wherein a count control signal input and a reload signal input of each converter of the combined converter are respectively a maximum count signal output and a count zero signal output of a directly subsequent converter of the combined converter.

14. A signal conversion system comprising:
   means for receiving a count corresponding to a predetermined distance as a position signal input;
   means for receiving direction indicia as a direction signal input; and
   means operationally coupled to the receiving position indicia means and receiving direction indicia means for generating an output signal based on the position signal input and the direction signal input that is on average a non-integral multiple of the position signal input.

15. The system of claim 14 wherein the output signal generating means comprises:
   means for incrementing a count value in the event the count is generated while the direction signal input is at a first value;
   means for decrementing the count value in the event the count is generated while the direction signal input is at a second value;
   means for generating a count output and resetting the count value to zero when another count is generated after a maximum number of counts has been reached while the direction signal input is at the first value; and
   means for generating a count output and resetting the count value to the maximum number of counts when another count is generated after a count value of zero has been reached while the direction signal input is at the second value.

16. The system of claim 15 wherein the output signal generating means further comprises:
   means for activating a maximum count signal output when the maximum number of counts has been reached; and
   means for activating a count zero signal output when the count value of zero has been reached.

17. The system of claim 15 wherein the output signal generating means further comprises:
   means for receiving a count control signal input;
   means for receiving a reload signal input;
   means for setting the maximum number of counts to a first maximum value in a set of maximum number of counts when either the count control signal input becomes active or the reload signal input becomes active; and
   means for setting the maximum number of counts to a second maximum value in the set of maximum number of counts when either the count control signal input becomes inactive or the reload signal input becomes inactive.

18. The system of claim 16 wherein the output signal generating means further comprises:
   means for receiving a count control signal input;
   means for receiving a reload signal input;
   means for setting the maximum number of counts to a first maximum value in a set of maximum number of counts when either the count control signal input becomes active or the reload signal input becomes active; and
   means for setting the maximum number of counts to a second maximum value in the set of maximum number of counts when either the count control signal input becomes inactive or the reload signal input becomes inactive.

19. The system of claim 18 wherein the count receiving means and the direction indicia receiving means and the output signal generating means comprise a first converter, the system further comprising a plurality of additional converters chained to one another and chained to the first converter subsequent to the first converter thereby creating a combined converter, wherein each of the plurality of additional converters is adapted to generate an additional output signal that is a function of an additional input signal, wherein the direction signal input is a direction signal input for each converter of the combined converter, wherein the additional output signal from each converter of the combined converter is the additional input signal to a directly subsequent converter of the combined converter, and wherein a count control signal input and a reload signal input of each converter of the combined converter are respectively a maximum count signal output and a count zero signal output of a directly subsequent converter of the combined converter.

* * * * *